United States Patent [19]
Menke et al.

[11] 3,881,103
[45] Apr. 29, 1975

[54] OPTICAL APPARATUS FOR SELECTIVELY FORMING IMAGES OF DIFFERENT FIELD SIZES IN THE SAME IMAGE PLANE

[75] Inventors: Josef-Ferdinand Menke, Heidelberg; Gunter Pusch, Eberbach; Siegfried Roth, Wiesenbach, all of Germany

[73] Assignee: Eltro GmbH & Co., Heidelberg, Germany

[22] Filed: Nov. 27, 1967

[21] Appl. No.: 687,958

[30] Foreign Application Priority Data
Nov. 25, 1966 Germany.................. 32918

[52] U.S. Cl.............. 250/203 R; 250/351; 350/34
[51] Int. Cl. ........................................ G02b 27/10
[58] Field of Search ............ 350/1, 2, 33, 34, 160, 350/161, 285, 183, 184, 38, 203, 251

[56] References Cited
UNITED STATES PATENTS

| | | |
|---|---|---|
| 2,120,654 | 6/1938 | Spence, Jr. et al. ............... 350/34 |
| 2,277,065 | 3/1942 | Bock................................... 350/34 |
| 2,481,082 | 9/1949 | Chew ............................ 350/34 UX |
| 2,578,013 | 12/1951 | Monk................................. 350/34 |
| 3,152,214 | 10/1964 | Korones et al.................. 350/34 X |
| 3,219,642 | 11/1965 | Killpatrick ..................... 350/2 UX |
| 3,338,656 | 8/1967 | Astheimer........................ 350/1 X |

FOREIGN PATENTS OR APPLICATIONS
1,463,509 11/1966 France................................ 350/34

Primary Examiner—Verlin R. Pendegrass

[57] ABSTRACT

Image transmitted through objective is selectively deflected or not by a controllable intercepting element. When so deflected, image passes to image or focal plane with a certain field size. When not deflected by intercepting element, image is subsequently deflected and directed to same image or focal plane with a different field size. Apparatus is particularly useful in infrared devices and can be provided with coordinate determining device at focal plane.

12 Claims, 5 Drawing Figures

OPTICAL APPARATUS FOR SELECTIVELY FORMING IMAGES OF DIFFERENT FIELD SIZES IN THE SAME IMAGE PLANE

DETAILED DESCRIPTION

Figure 1:
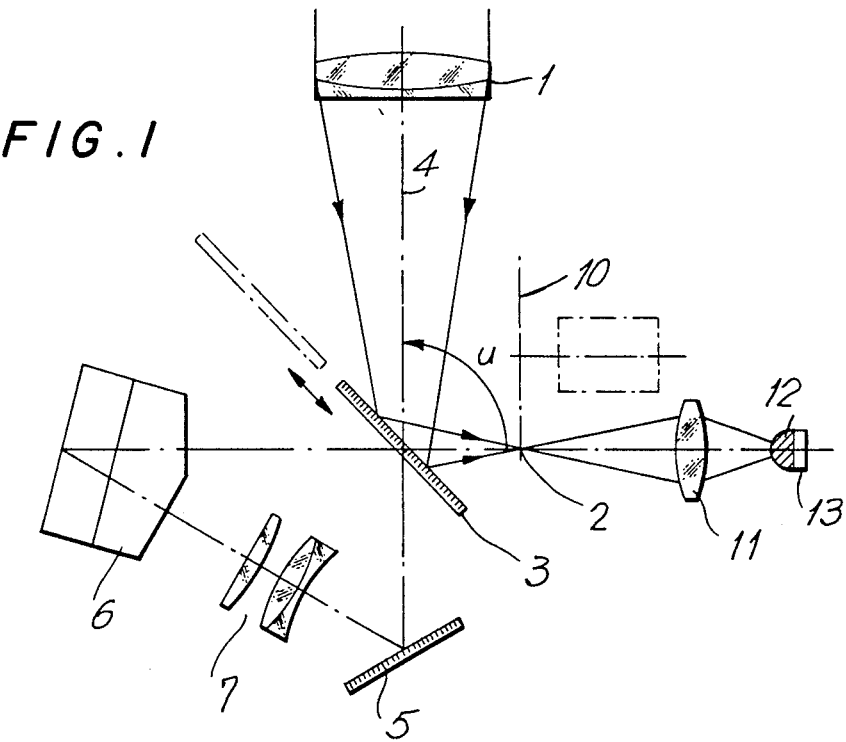

This invention relates to optical arrangements with objectives for generating an image of an infinitely or greatly removed object in an image plane, and more particularly to such arrangements for use in locating equipment.

Optical locators operating in the wavelength range of visible light or of infrared and possessing receiving elements sensitive to these ranges have been used for spotting the exact positions of objects which emit radiation within the aforesaid wavelength ranges.

Especially where a moving object is concerned which is to be spotted and tracked continuously, optical locating equipment must have the capability, first of all, to offer a sufficient precision in the initial locating of the object, and secondly, a very high precision of measurement in the ensuing determination of the coordinates of the object represented, for example, in the form of an image point.

It is an object of the present invention to provide, in particular for the aforesaid locating equipment, an optical arrangement making possible the successive setting of two or more image angles of different size at the image plane of the objective.

An optical arrangement with an objective which generates the image of an infinitely or greatly removed object in an image plane is devised in such a manner, according to the invention, that at least one optical deflection system is placed in the image forming path of radiation, whose relative position to the beam of radiation coming from the input objective or whose optical properties with regard to reflection and transparency is variable in such a manner that there is generated, either a first image in a plane coinciding with the focal plane of the input objective with an image field size determined by the focal length of that objective, or a second image in the same plane having, however, an image field size differing from that of the first image, this second picture being generated by an image forming lens system placed in the further ray path following the deflection system.

Since there may exist cases where it will, for example, be advantageous to set successively three different image angles, it is possible according to the invention that, with the use of a second optical deflection system placed behind the first one, of the nature already described, and an additional image forming lens system, three images of different image field size will be successively generated in the same given image plane.

The optical arrangement of the invention is by no means limited to optical locating or spotting equipment, but can also be used to great advantage in all cases where it is desired to generate image angles of different sizes in succession to each other or to switch to and fro between such different image angles, all for an image appearing in one and the same image plane, especially where such switching over from one image angle to the other must be performed rapidly and surely.

The characteristics of the invention will next be described in greater detail with reference to the drawings. These drawings show various embodiments of the invention.

DRAWING

Figure 2:
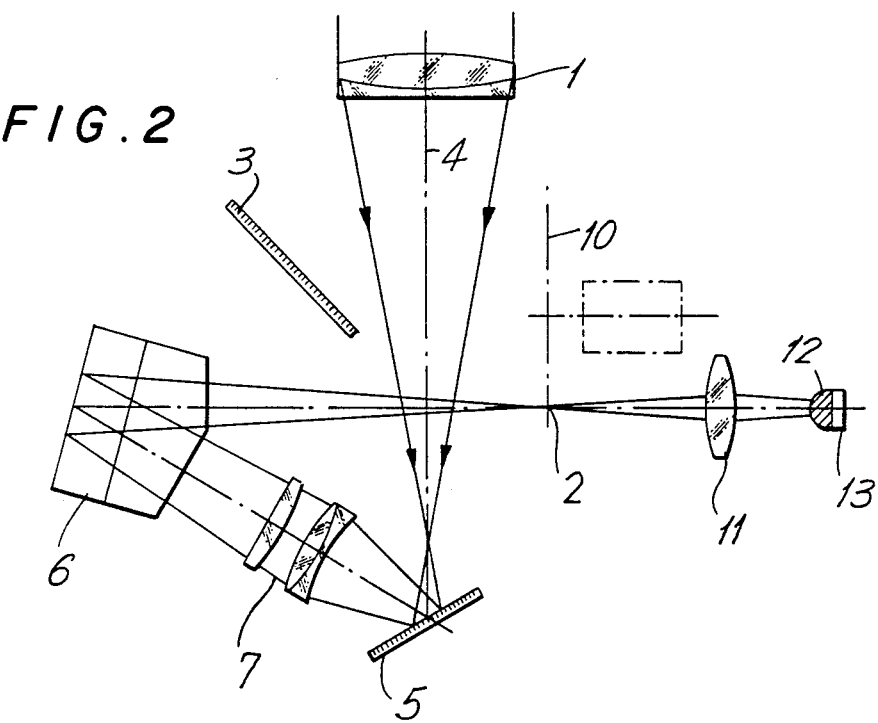
Figure 3:
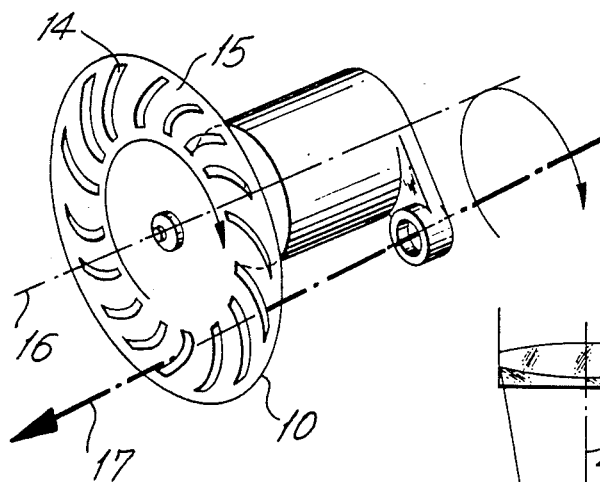
Figure 4:
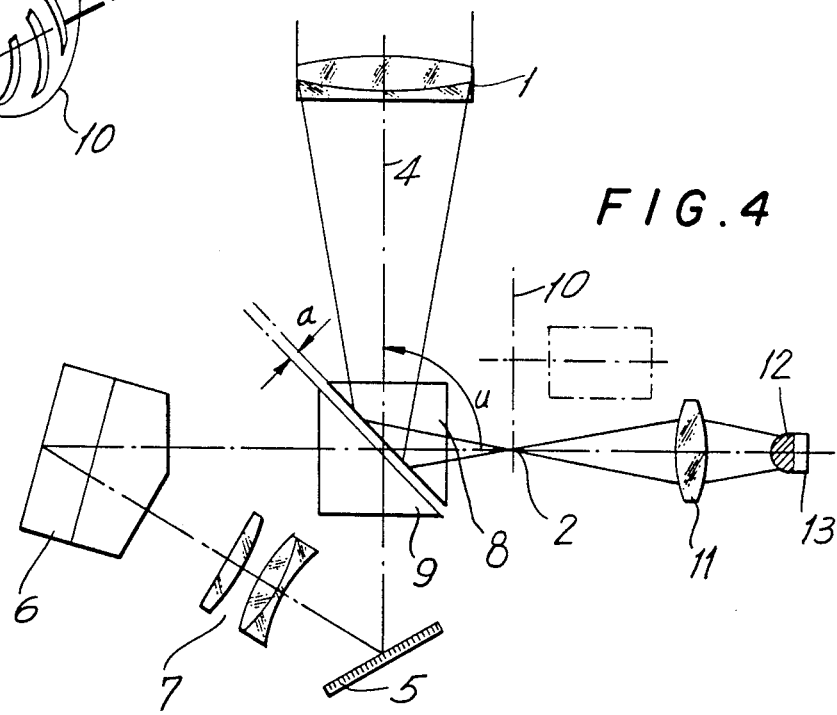
Figure 5:
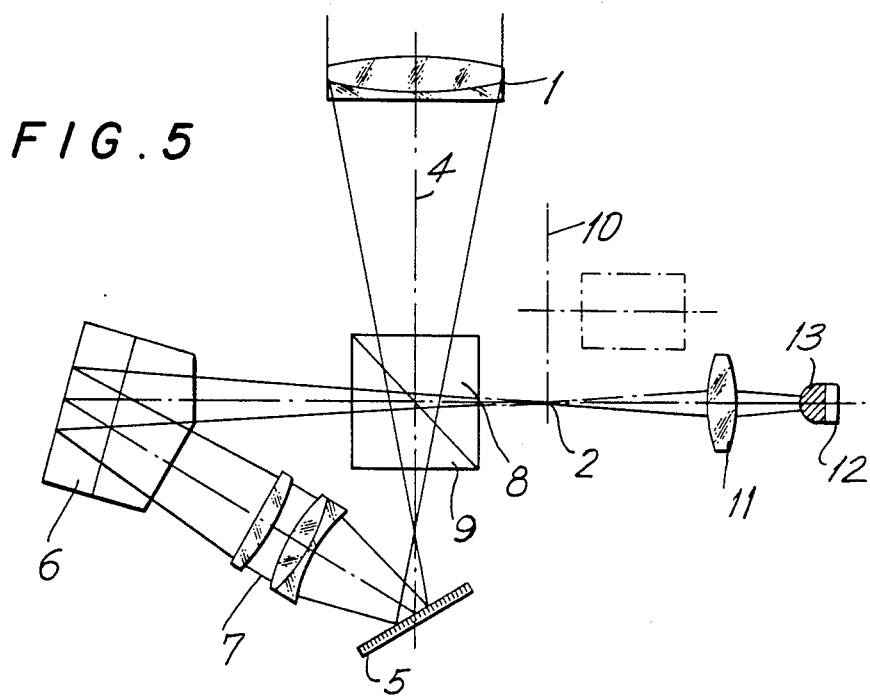

FIGS. 1 and 2 diagrammatically show an optical arrangement for a radiation spotting unit having an optical deflection system whose position relative to the ray path coming from the input objective can be modified;

FIG. 3 diagrammatically shows a mechanical scanning system located in the focal plane of the input objective of a radiation locating unit; and FIGS. 4 and 5 diagrammatically show an optical arrangement containing an optical deflection system whose optical properties with regard to reflectivity and transparency are variable within the ray path of the input objective.

Through an input objective 1 of large focal opening an image of a remote object is generated in the focal plane 2 of the input objective 1. Between the input objective 1 and its focal plane 2, a totally reflecting mirror 3 is arranged as deflection system which, in a plane forming the angle $90° - D/2$ ($D$ = the desired angle of deflection) with the optical axis 4 of the input objective 1 can be moved into or out of the image forming ray path of the input objective 1. In the example shown, the angle of deflection $D = 90°$, so that the mirror 3 forms an angle if 45° with the optical axis 4.

The double arrow shown in FIG. 1 shows the directions in which the mirror 3 can be moved. This mobility can, for example, be provided by mechanical or electrical means (not shown) and in such a manner that it will be possible to remove the mirror 3 for short intervals from, or to move it into, the ray path. The contours of the mirror 3 shown in dotted lines in FIG. 1 indicate the position where the mirror is shown in action in FIG. 2. The ray path behind the mirror contains two fixed optical deflection elements 5 and 6, between which a three-lens image forming system 7 cooperating with the input objective has been arranged.

As can be seen from the arrangement according to FIG. 2, this causes the beam of rays leaving the last deflection element 6 to be focussed into the focal plane 2 of the input objective 1 located on the ray path.

The deflecting element 6 preferably consists of a reversing prism, which causes the image reversion due to the image forming system 7 to be compensated.

FIGS. 4 and 5 show practically the same optical arrangement as in FIGS. 1 and 2 except for the difference that between the input objective 1 and its focal plane 2 there is arranged, in lieu of the movable mirror, a prism system capable of being combined to form a plane parallel plate. This system of prisms consists of two identical rectangular prisms 8 and 9, whose hypotenuse surfaces form the angle $90° - D/2$ (where $D$ is the desired angle of deflection) with the optical axis 4 of the input objective 1. In this example, the angle is again 45° for $D = 90°$.

The prisms 8 and 9 are movable relative to each other along the optical axis 4 of the input objective 1, so that prism 8 will be totally reflective when between the hypotenuse surfaces of the prisms 8 and 9 there is a small distance a (see FIG. 4), or the combined prism system will be totally transparent when the hypotenuse surfaces of the prisms are pressed together in close contact (see FIG. 5). Thus, this system of prisms represents an optical deflection system, whose optical properties concerning reflection and transparency are variable.

In either case, i.e. with the use of a movable mirror or of a system of prisms of the nature shown in FIGS. 4 and 5, the optical arrangement according to the invention makes it possible to produce successively in the focal plane 2 of the input objective 1, which also lies on the displaced path of the deflected ray, images of different image field size and correspondingly different image angles.

Returning for further consideration to the arrangement according to FIGS. 1 and 2, it is seen that according to FIG. 1, with the mirror 3 inserted into the ray path, a relatively large image angle is produced in the focal plane 2. If mirror 3 is eliminated from the path of the rays, then as shown in FIG. 2, a considerably smaller image angle is produced in the focal plane 2. The input objective 1 forms in this case in combination with the lens system 7 an optical system having a focal length longer than that of the input objective 1 alone. This is also valid as to the arrangement according to FIGS. 4 and 5. Thus, the optical arrangement according to the invention also constitutes an optical system of instantly variable focal length.

For the application of the optical arrangement according to the invention for optical spotting equipment (radiation locating equipment) this offers the advantageous possibility of providing at the focal plane 2 of the input objective 1 a mechanical scanning system 10 for modulating the image area radiation. Behind the same is placed a field lens system 11, which is used for causing the modulated radiation to converge onto the radiation sensitive element 13 equipped with immersion optics 12.

FIG. 3 shows a suitable mechanical scanning system in schematic representation. This system consists essentially of a modulating stop or disc 10 having adjacent transparent and nontransparent sectors 14 and 15 respectively. The modulating stop or disc rotates around its center axis 16 which is separate from but parallel to its optical axis 17, and simultaneously nutates with its center axis 16 around the optical axis 17. Thus, the radiation of an image point is subjected to a frequency modulation, whose characteristic values represent scale factors for the desired image field coordinates.

A further advantageous possibility in accordance with the invention is offered by the possibility of using the optical arrangement with reversal of the ray paths as a projector, in which case the radiation sensitive element 13 would be replaced by a light source.

In equipment operating in the infrared wavelength range, the optical arrangement according to the invention as a whole, can be embodied as an infrared optical system.

Finally, the optical arrangement according to the invention can be embodied as an optical sighting system for periscope or telescope, in which case the mechanical scanning system 10 and the radiation sensitive element 13 would be replaced by a field lens system and an ocular system.

What is claimed is:

1. An optical arrangement comprising an objective adapted for transmitting an image of a remote object along an optical path, controllable means arranged along said path and selectively capable of reflecting the image to an image plane corresponding with the focal plane of said objective or of being transparent to said image, and optical deflection means to receive the image when the controllable means is transparent thereto and to direct the thusly received image to said image and focal plane with an image field size which is different from that of the reflected image.

2. An optical arrangement as claimed in claim 1, wherein said deflection means includes at least two deflection elements and an image forming lens system therebetween.

3. An optical arrangement as claimed in claim 2, wherein one of said elements is a reversing prism.

4. An optical arrangement as claimed in claim 1, wherein said controllable means is a displaceable mirror adapted for being selectively positioned in and out of intercepting relationship with said optical path.

5. An optical arrangement as claimed in claim 4, wherein said controllable means includes in intercepting relationship with said optical path two relatively displaceable elements adapted for being spaced or in contact in order to be transparent or reflective to an image transmitted along said path.

6. An optical arrangement as claimed in claim 1, wherein said controllable means has a reflective surface arranged at an angle D to said optical path such that $D = U/2$ wherein U is the desired angle of deflection of the image.

7. An optical arrangement as claimed in claim 1 comprising further means for the selective formation of a further image in said image plane.

8. An optical arrangement as claimed in claim 1 comprising means to analyze and determine coordinates for the image in said image plane.

9. An optical arrangement as claimed in claim 8, wherein the latter said means includes a slotted disc wherein is rotatable on its own axis and has an optical axis about which the disc nutates while rotating.

10. An optical arrangement as claimed in claim 9 comprising infrared sensitive means associated with said disc.

11. An optical arrangement as claimed in claim 1 comprising a light source transmitting light via said controllable means and deflection means to said objective.

12. An optical arrangement as claimed in claim 2, wherein said lens system is a three lens system.

* * * * *